United States Patent [19]

Ness

[11] 4,057,183
[45] Nov. 8, 1977

[54] GUN RACK

[76] Inventor: Philip J. Ness, 5948 Mendocino Blvd., Sacramento, Calif. 95824

[21] Appl. No.: 674,117

[22] Filed: Apr. 6, 1976

[51] Int. Cl.² .............................................. B60R 9/00
[52] U.S. Cl. .............................. 224/42.45 R; 211/64; 224/42.42 R; 248/205 R
[58] Field of Search ............ 224/1 R, 42.32, 42.42 R, 224/42.45 R, 42.46 R, 42.24, 29 R, 42.12, 42.25, 42.31; 296/3; 37.13; 280/179 R; 211/60 R, 60 G, 60 SK, 64, 86; 248/201, 203, 205 R, 146, 311.1; 108/44

[56] References Cited

U.S. PATENT DOCUMENTS

| 1,529,604 | 3/1925 | Mortensen | 248/146 |
| 1,765,785 | 6/1930 | Baker | 224/42.24 |
| 2,535,564 | 12/1950 | Campbell | 211/64 X |
| 2,783,896 | 3/1957 | Agostini et al. | 224/42.42 R |
| 3,294,247 | 12/1966 | Norrington | 224/42.42 R X |
| 3,589,577 | 6/1971 | Basinger | 224/42.42 R |
| 3,650,444 | 3/1972 | Gibson et al. | 224/42.42 R |
| 3,767,093 | 10/1973 | Pinkerton et al. | 224/42.45 R X |
| 3,848,786 | 11/1974 | Baxter | 224/42.45 R |
| 3,857,491 | 12/1974 | Townsend et al. | 224/42.45 R X |
| 3,893,568 | 7/1975 | Lile | 224/42.45 R X |

FOREIGN PATENT DOCUMENTS

| 1,237,193 | 6/1959 | France | 224/42.46 R |

Primary Examiner—Robert J. Spar
Assistant Examiner—Winston H. Douglas
Attorney, Agent, or Firm—Blair & Brown

[57] ABSTRACT

A rack for guns or other sporting equipment to be mounted on the wheel well in the interior of pick-up trucks or other vehicles so that the guns or other equipment will be held securely in a protected position for easy access but not easily seen by persons outside of the vehicle.

1 Claim, 4 Drawing Figures

GUN RACK

BACKGROUND OF THE INVENTION

FIELD OF THE INVENTION

SUMMARY OF THE INVENTION

Fisherman, skiers and more especially hunters often travel to the area where they will be fishing, skiing or hunting in vehicles known as pick-up trucks that have part of their body formed with an exterior recess or "wheel well" so that the outer surface of the body is beyond the outer surface of the rear wheel. This wheel well forms a bulge in the interior of the truck body that somewhat restricts the flat surface of the truck floor. There is, however, space above the wheel well within the truck body; space that is ordinarily unused or is occupied by last minute small items indiscriminately piled onto the wheel well. Articles such as fishing rods, skis and hunting guns require care in handling, and guns in particular should be stowed in a manner not to be visible to a possible thief. It is clearly undesirable to place a hunting gun on the floor of the truck under other baggage and it is not desirable merely to place the guns on top of other baggage.

It is an object of the present invention to provide a simple, inexpensive rack to support guns, or other sporting equipment in a manner to protect them from harm, to use space often wasted and to place guns, or other equipment, in a position such that the likelihood of possible thieves spotting them is remote, and also in a position where they may be safely concealed by light baggage placed adjacent the equipment.

Other objects and advantages will become apparent in the following specification when considered in light of the attached drawings.

DESCRIPTION OF THE PREFERRED EMBODIMENT

Figure 1:
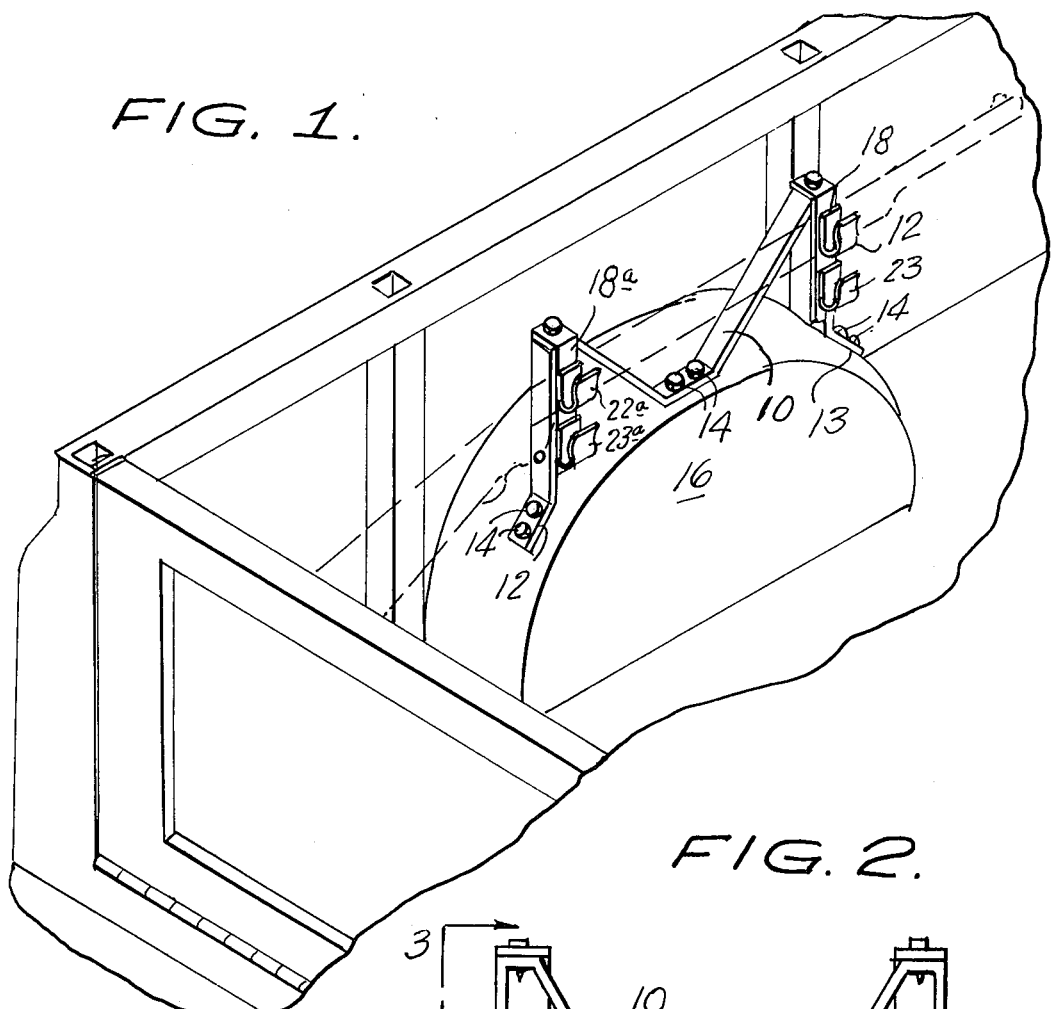
FIG. 1 is a perspective view of the rack of the present invention mounted on the wheel well of a pick-up truck. A gun is shown in dotted lines in place in the rack.
Figure 3:
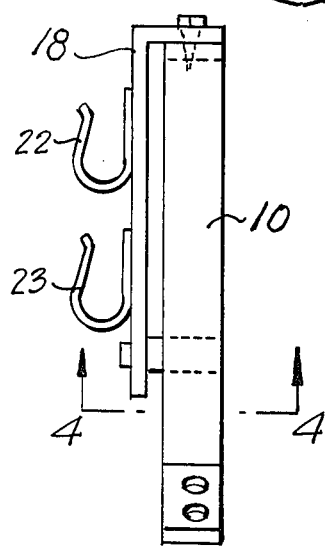
FIG. 3 is an end view of the rack looking in the direction of the arrows on line 3—3 of FIG. 2.
Figure 2:
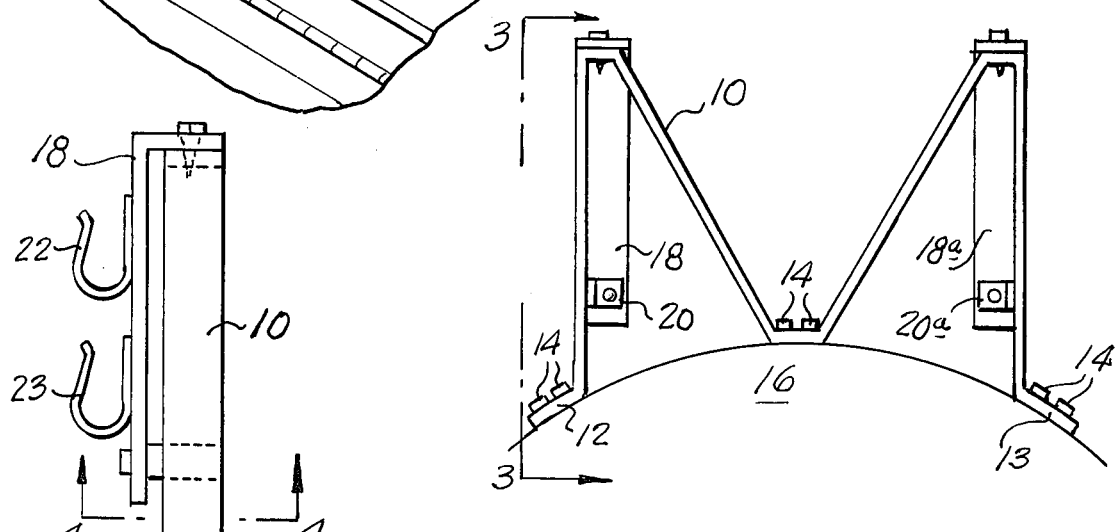
FIG. 2 is an elevation of the rack at a point between the rack and the side wall of the truck body.
Figure 4:
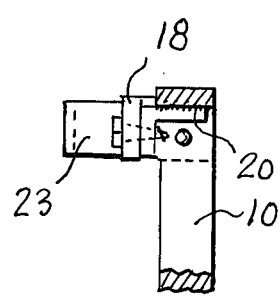
FIG. 4 is a section taken on line 4—4 of FIG. 3.

Guns and other sporting equipment should not be subjected to the hazards of being merely placed in the body of a truck where they would be subject to damage by abrasion against the truck bottom or to damage by having heavy objects dropped, or even merely placed on them. Having such equipment placed loose on top of the cargo in the truck is also not suitable.

The space above the wheel wells of pick-up trucks and the like, is utilized in the present invention to stow a hunting gun, for instance, to keep it safe from physical harm and to place it in a position to be hidden from possible thieves.

The device, as seen in the drawings comprises an M shaped frame 10, the ends of the two legs of the M being formed into pads 12 and 13 and having appropriate screw holes provided to receive screws 14. The bottom of the valley of the M is also flattened and provided with holes to receive screws 14. All screws 14 penetrate the metal of wheel well 16.

Fastened to each of the peaks of the M shaped frame 10 is a support element 18 or 18a.

Elements 18 and 18a are inverted L shaped pieces, the foot of the L being secured by any appropriate means to the peak of the M and the shank of the L extending downwardly vertically adjacent to the end member of the M. The securing means is shown as being a screw similar to screws 14 but other means such as welding could be used.

Elements 18 and 18a are each secured at the lower ends of their shanks to clips 20 or 20a respectively mounted on the M shaped frame 10, and here again, while the securement is shown as being by a screw, the securement may be by welding or other means.

Mounted on each L shaped element 18 and 18a are clips 22, 23 and 22a, 23a; while two clips are shown on each element 18 and 18a, the number of clips may be varied. The clips shown are of spring metal which may, of course, be plastic or leather covered and which are suitable to receive and securely hold a rifle or shotgun as indicated in dotted lines in FIG. 1.

Clips to receive and hold fishing rods, or to receive and hold skis would need to be modified from the clips shown at 22, 23 for instance.

Having thus described the preferred embodiment of the invention it should be understood that numerous structural modifications and adaptations may be resorted to without departing from the spirit of the invention.

What is claimed is:

1. A rack for guns or the like to be mounted on an upwardly extending curvilinear wheel well of a pickup truck bed comprising an M-shaped frame having two vertical legs curved at their ends to conform to the wheel well shape and a valley therebetween also conforming to the wheel well, means at the lower extremities of said legs and at the bottom of said valley to secure said frame to the wheel well within the vehicle, inverted L-shaped support elements secured at the top of each of said vertical legs to extend downwardly along the vertical legs, and at least one U-shaped clip secured to each said support element to support a gun or the like therebetween.

* * * * *